United States Patent
Inoguchi

(10) Patent No.: US 10,715,749 B2
(45) Date of Patent: *Jul. 14, 2020

(54) INFRARED BAND PASS SYSTEM FOR OPTICAL DETECTION OF PARAMETERS

(71) Applicant: Schott Glass Technologies (Suzhou) Co. Ltd., Jiangsu (CN)

(72) Inventor: Kazuyuki Inoguchi, Tokyo (JP)

(73) Assignee: Schott Glass Technologies (Suzhou) Co. Ltd., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,243

(22) Filed: Sep. 12, 2019

(65) Prior Publication Data

US 2020/0007795 A1    Jan. 2, 2020

Related U.S. Application Data

(60) Division of application No. 16/045,288, filed on Jul. 25, 2018, now Pat. No. 10,455,167, which is a
(Continued)

(51) Int. Cl.
| | |
|---|---|
| *G01N 21/62* | (2006.01) |
| *H04N 5/33* | (2006.01) |
| *G02B 5/28* | (2006.01) |
| *G06F 21/32* | (2013.01) |
| *G06K 9/00* | (2006.01) |
| *H04L 29/06* | (2006.01) |
| *G07C 9/37* | (2020.01) |
| *G02B 5/20* | (2006.01) |
| *H04N 9/04* | (2006.01) |
| *H04W 12/06* | (2009.01) |

(52) U.S. Cl.
CPC ............ *H04N 5/33* (2013.01); *G02B 5/285* (2013.01); *G06F 21/32* (2013.01); *G06K 9/00597* (2013.01); *H04L 63/0861* (2013.01); *G02B 5/208* (2013.01); *G07C 9/37* (2020.01); *H04N 9/04* (2013.01); *H04W 12/06* (2013.01)

(58) Field of Classification Search
None
See application file for complete search history.

(56) References Cited

U.S. PATENT DOCUMENTS

| | | |
|---|---|---|
| 4,738,896 A | 4/1988 | Stevens |
| 6,905,462 B1 | 6/2005 | Homma et al. |
| | (Continued) | |

FOREIGN PATENT DOCUMENTS

| | | |
|---|---|---|
| CN | 103261927 A | 8/2013 |
| CN | 104301633 A | 1/2015 |
| | (Continued) | |

OTHER PUBLICATIONS

International Search Report dated Oct. 26, 2016 for International Application No. PCT/CN2016/072044 (2 pages).

*Primary Examiner* — David P Porta
*Assistant Examiner* — Mamadou Faye
(74) *Attorney, Agent, or Firm* — Taylor IP, P.C.

(57) ABSTRACT

A glass substrate having an average thickness of the glass substrate from 0.01 to 1.2 mm and having a temperature dependence of refractive index at a wave-length of 850 nm in a temperature range from −40° C. to 60° C. of not more than $10 \times 10^{-6}$/K.

16 Claims, 1 Drawing Sheet

Related U.S. Application Data continuation of application No. PCT/CN2016/072044, filed on Jan. 25, 2016.

(56) References Cited

U.S. PATENT DOCUMENTS

| | | |
|---|---|---|
| 8,408,821 B2 | 4/2013 | Wu et al. |
| 8,750,577 B2 | 6/2014 | Britz et al. |
| 9,690,970 B2 * | 6/2017 | Wang |
| 10,455,167 B2 * | 10/2019 | Inoguchi ............ H04L 63/0861 |
| 2003/0164891 A1 * | 9/2003 | Akimoto ............ H04N 5/2253 |
| | | 348/340 |
| 2011/0096960 A1 | 4/2011 | Britz et al. |
| 2013/0016203 A1 | 1/2013 | Saylor et al. |
| 2013/0186140 A1 | 7/2013 | Brix et al. |
| 2013/0227678 A1 | 8/2013 | Kang et al. |
| 2014/0357467 A1 | 12/2014 | Buellesfeld et al. |
| 2015/0274573 A1 | 10/2015 | Buellesfeld et al. |
| 2015/0369663 A1 * | 12/2015 | Margalit ............... G01J 3/26 |
| | | 356/326 |

FOREIGN PATENT DOCUMENTS

| | | |
|---|---|---|
| JP | 2002-321937 A | 11/2002 |
| WO | 2013/010127 A2 | 1/2013 |

\* cited by examiner

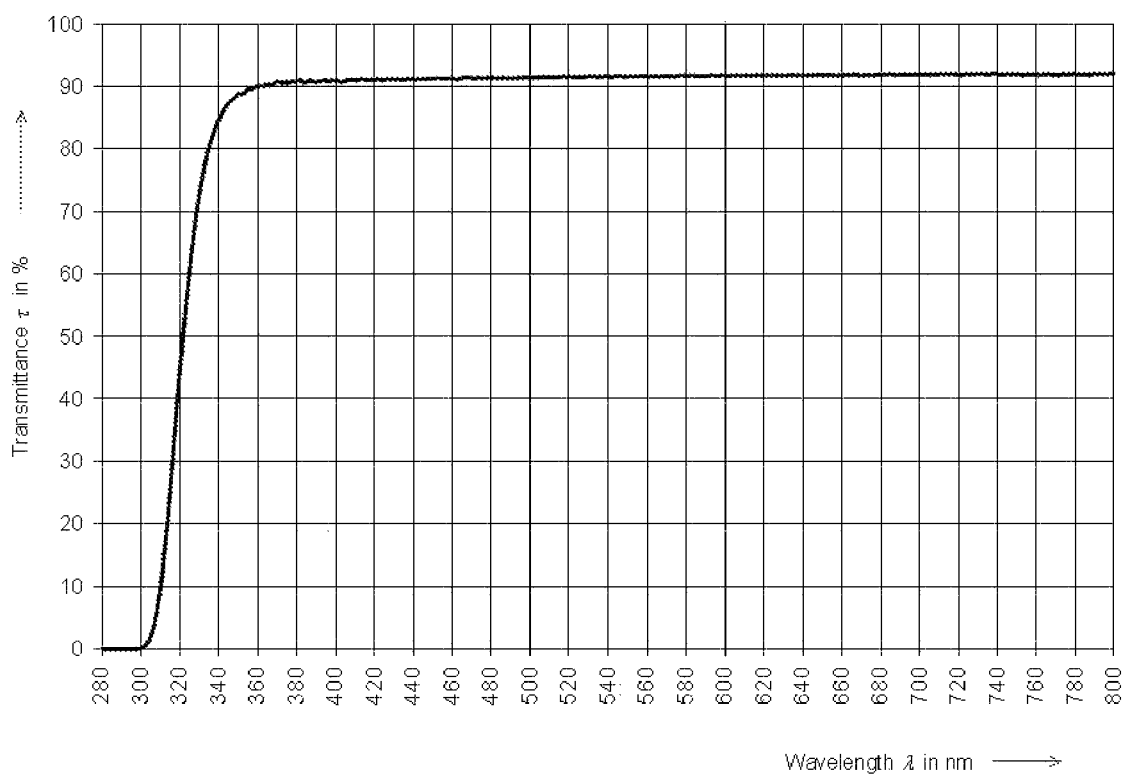

INFRARED BAND PASS SYSTEM FOR OPTICAL DETECTION OF PARAMETERS

CROSS REFERENCE TO RELATED APPLICATIONS

This is a division of U.S. patent application Ser. No. 16/045,288, entitled "SYSTEM FOR OPTICAL DETECTION OF PARAMETERS", filed Jul. 25, 2018, which is incorporated herein by reference. U.S. application Ser. No. 16/045,288 is a continuation of PCT application No. PCT/CN2016/072044, entitled "SYSTEM FOR OPTICAL DETECTION OF PARAMETERS", filed Jan. 25, 2016, which is incorporated herein by reference.

BACKGROUND OF THE INVENTION

1. Field of the Invention

This invention relates to a parameter detection system, an infrared band pass filter, and a glass substrate for the infrared band pass filter as well as a method for detecting parameters.

2. Description of the Related Art

A parameter detection system as described above can for example be used for detecting parameters in individuals, such as iris recognition, 3D scanning, touch sensors, biometrics, interactive displays, gaming and gesture control.

In the sense of this invention a "parameter detection system" is a typically electronic system that is capable of measuring at least one parameter of at least one individual or object. The parameter that is measured can be selected from any parameters that can be measured using optical means. "Detection" includes qualification and/or quantification of the respective parameter.

2. Description of the Related Art

Gesture control devices, iris scanners and other related parameter detection devices are as such known from the prior art. These devices typically comprise an infrared light source for illuminating the area to be detected ("illumination unit"). The wavelength irradiated by the light source typically is in the area of from 800 to 900 nm. In order to capture infrared light that is coming back from the area to be detected, e.g. the person who uses the device, it is preferable that only the wavelength of light which carries the useful information is measured. Measuring only the desired wavelength and filtering out other ranges of the wavelength spectrum, increases the signal-to-noise (S/N) ratio and allows the illuminating light intensity to be decreased. For this purpose infrared band pass filters are used that have good transmission in the desired wavelength regions. The wavelength region that passes the filter is called "passband region".

The reason why infrared light is used to illuminate the scene is that the S/N ratio can be improved, in particular in environments with high brightness in the visible wavelength range.

Other components that may be used in such a device are a lens that gathers the light reflected from the scene and an image sensor such as a time-of-flight camera. The image sensor measures the time the light has taken to travel from the illumination unit to the detected object and back. Thus, the devices usually comprise an illumination device, a band pass filter, and an image sensor.

WO 2013/010127 A2 teaches biometric imaging devices and methods. The systems described therein contain a light source and an imaging device. An infrared transparent medium can be used to conceal the imaging device from the individual. The infrared transparent medium can be made of glass or plastic and it can include a coating. The document focuses on the semiconductor device used in the imaging device. The imaging device may also include an infrared filter. No further details are discussed.

U.S. Pat. No. 8,750,577 B2 discloses a method and apparatus for eye-scan authentication using a liquid lens. US 2013/0227678 A1 relates to a method and system for authenticating a user of a mobile device. A lot of different configurations for detection systems of biometric data and other parameters have been published. However, little emphasis has been put on optimizing band pass filters for use in such devices.

Different substrates can be used for infrared band pass filters. Each substrate has certain properties and a benefit in one property may be accompanied by a drawback regarding another property of the substrate. Most band pass filters comprise a substrate and one or more coatings. Some of the properties that such a filter should have are the following:

high transmission in the passband region;
very low transmission in the block region;
scratch resistance;
resistance to breakage even at low thickness;
good chemical stability, e.g. hydrolytical stability;
compatible thermal expansion;
optimized optical properties;
low angle dependency of optical properties;
low content of environmentally harmful or toxic components;
low specific weight;
low radiation (fluorescence, phosphorescence, radioactivity);
low manufacturing costs;
availability in low thicknesses and with low thickness variance; and
thermal shock resistance.

High transmission at the desired wavelength is of particular relevance because light intensity cannot be increased to very high values. Light of very high intensity will damage the user's tissue, in particular in iris recognition systems. Also, illuminating the scene with high light intensities requires a lot of energy.

Many parameter detection systems are useful in portable devices such as mobile phones and tablet or laptop computers. Portable devices are subject to variations in ambient temperature. For example, a mobile device should work not only indoors but also when being used outside. During outdoor activities (such as skiing) very cold temperatures may affect the device. Also, very hot temperatures may occur in situations when a device is in direct sun light. Generally, the temperature range within which a portable electronic device or a device for outdoor use in general should work properly is roughly from −40° C. to 60° C., i.e. in a temperature range of about 100° C. It has been found that this is not a self-evident property in many materials.

It has been found that the optical properties should not only be good for the desired application but the optical properties should also remain as constant as possible over the indicated temperature range. While transmission does usually not vary very much with changing temperature, the refractive index varies to a significant extent with changing temperatures. Even this may not be very problematic in certain optical systems, but when it comes to coated systems, the refractive index change causes a change in transmission as well. This is all the more relevant when it is considered that many parameter detection systems perform very delicate measurements. In iris recognition systems for example the structure of the human iris is detected. In order to work properly the system must be calibrated. A system may be calibrated at room temperature and later on used outside at much lower or higher temperatures. Systems with high temperature dependence of refractive index will suffer from bad parameter detection properties when the device is e.g. calibrated at room temperature and used at substantially different temperatures.

SUMMARY OF THE INVENTION

The present invention provides a glass substrate that may be used in a parameter detection systems that works reliably even at markedly different temperatures.

In one embodiment the present invention is a glass substrate having an average thickness of the glass substrate from 0.01 to 1.2 mm and having a temperature dependence of refractive index at a wave-length of 850 nm in a temperature range from −40° C. to 60° C. of not more than $10 \times 10^{-6}$/K.

In another embodiment the present invention is an infrared band pass filter including a glass substrate and at least one coating, the glass substrate having a thickness of 0.01 to 2 mm, the glass substrate having a temperature dependence of refractive index at a wavelength of 850 nm in a temperature range from −40° C. to 60° C. of not more than $10 \times 10^{-6}$/K, and the at least one coating having a thickness of not more than 0.5 mm.

In yet another embodiment the present invention is an infrared band pass filter having a glass substrate and at least one coating, the glass substrate having a thickness of 0.01 to 2 mm, the at least one coating having a thickness of not more than 0.5 mm, and the temperature dependent center wavelength drift in the filter is less than 15 nm in a temperature range from −40° C. to 60° C.

A desirable device should also exhibit beneficial transmission properties, scratch resistance, filter proper-ties, mechanical stabilities even at low thicknesses, low angle dependency of optical properties, low manufacturing cost and excellent hydrolytical and chemical stability. All these desirable pre-requisites are met by the subject-matter described herein.

It has been found that the temperature dependence of refractive index of the substrate in a coated filter used in a parameter detection system should be as low as possible. The present invention provides for systems, band pass filters and substrates for band pass filters that allow for very reliable operation of parameter detection systems at markedly different temperatures.

The invention provides a parameter detection system comprising:
 a) at least one light source capable of emitting light in the direction of an object or person;
 b) at least one band pass filter comprising a substrate and at least one coating;
 c) optionally, at least one optical lens capable of gathering light of the emitted wavelength; and
 d) at least one image sensor positioned to receive light reflected from the object or person;
  wherein the filter is positioned such that light that is incident upon the lens and/or the image sensor must pass through the filter before being gathered by the lens and/or received by the image sensor;
  wherein the light emitted by the light source is infrared light in a wavelength region of from 780 nm to 1,000 nm, preferably from 800 to 900 nm;
  wherein the filter has a passband in a wavelength region of from 780 nm to 1,000 nm, prefer-ably from 800 to 900 nm;
  wherein the substrate is made of glass and has a thickness of from 0.01 to 2 mm;
  wherein the coating has a thickness of not more than 0.5 mm; and
  wherein the substrate has a temperature dependence of refractive index at a wavelength of 850 nm in a temperature range from −40° C. to 60° C. of not more than $10 \times 10^{-6}$/K.

It has been found that parameter detection systems of the kind outlined above show superior properties in terms of temperature tolerance, i.e. the ability to work with substantially the same efficacy at markedly different temperatures. The fact that the substrate has a temperature dependence of refractive index at a wavelength of 850 nm in a temperature range from −40° C. to 60° C. of not more than $10 \times 10^{-6}$/K bestows the filter used in the system with a good temperature tolerance. In some embodiments, the temperature dependence of refractive index of the substrate should be less than $8 \times 10^{-6}$/K, more preferably less than $6 \times 10^{-6}$/K, more preferably less than $4 \times 10^{-6}$/K and most preferably less than $2.5 \times 10^{-6}$/K in a temperature range of from −40 to +60° C.

The temperature dependence of refractive index can be measured easily by measuring the absolute refractive index of a substrate at different temperatures. With regard to the temperature values given above the value can easily be determined by measuring the refractive index of the substrate at −40° C. and at 60° C., i.e. over a range of 100 K. For the substrates of this invention the following is true:

$$(n_{850\ nm/60°\ C.} - n_{850\ nm/-40°\ C.})/100\ K = 10 \times 10^{-6}/K\ \text{or less}\ (n = \text{refractive index})$$

It has been found that the temperature dependent center wavelength drift of the filter decreases when the temperature dependence of refractive index is decreased in the substrate. Preferably, the temperature dependent center wavelength drift in the filter of the parameter detection system of this invention is less than 15 nm, more preferably less than 10 nm and most preferably less than 5 nm in a temperature range from −40° C. to 60° C. The temperature dependent center wavelength drift is measured by comparing the center wavelength of the passband of the band pass filter at different temperatures. The deviation of the center wavelength from the center wavelength at room temperature, i.e. 20° C., should not exceed the value indicated above.

It has further been found that a higher temperature dependence of refractive index will lead to undesirable transmission losses in the filter when the ambient temperature is markedly different from the temperature for which the system had been optimized.

The light source used in the parameter detection system of this invention may be a passive light source such as ambient light. Generally, the light source may be any light source which emits light in the desired wavelength region. An example of a passive light source is the sun. In some embodiments, the light source is an active light source, such as an LED.

The image sensor is preferably a sensor that is suitable to measure the incoming light in a wavelength range of from 780 to 1,000 nm, preferably from 800 to 900 nm. In another embodiment, the sensor is selected from a time-of-flight camera, a CCD or CMOS sensor, or a combination thereof.

The optional lens may preferably be a lens made of glass. It can be used to collect light that is reflected from the object or person. The band pass filter, the light sensor and the optional lens may be arranged in a housing. The light source may be arranged in the same housing, or a different housing. The elements of the system may be arranged in a device such as a portable device, including a smart phone, a portable computer, a computer watch, or a tablet computer. However, the system may also be arranged in stationary devices such as gaming devices, TV sets, person-al computers, intercommunication systems, home automation systems, automotive security systems. The system may also be used in 3D imaging systems with gesture control.

In particular, the system, filter and substrate of this invention may be used in a number of devices, including but not limited to smart phones, portable computers, computer watches, tablet computers, gaming devices, TV sets, personal computers, intercommunication systems, home automation systems, automotive security systems, 3D imaging systems, gesture control systems, touch sensors, fingerprint sensors, diagnostic systems, gaming devices, interactive displays, 3D sensing systems, home appliances, display devices, iris recognition systems and others. The system, filter and substrate of this invention may be used for a number of purposes including but not limited to iris recognition, 3D scanning, interactive display, biometric detection or measurement of biometric data, gesture control, gaming, fingerprint detection. Components of such devices may include, but are not limited thereto: optical or electrical interposers, thin film batteries, illumination devices, particularly OLED or backlight units, PCBs or other electronic wiring device, electronic passive component (particularly capacitors), cover lenses, protective layers and/or micro electro mechanical systems (MEMS)/micro opto mechanical systems (MOEMS).

Parameter detection systems of this invention may be used to detect a generally unlimited number of parameters. One prerequisite however is that the parameter can be detected optically, using infrared light. In some embodiments, the parameter to be detected is a parameter pertaining to a human being. The parameter to be detected may be selected from the iris structure of a human or animal, the posture or movement of a human or animal, or biometric data of a human or animal, such as iris structure. Biometric data that can be detected, i.e. measured using the systems of this invention include parameters pertaining to the face, hands, retina, iris, signature, veins, or voice of a subject. The systems of this invention can be used to analyze the facial characteristics of a subject, the fingerprints, hand geometry, i.e. shape of the hand, length of fingers, retina, i.e. analysis of capillary vessels at the back of the eye, iris, veins, e.g. pattern of veins in the back of the hand and the wrist.

This invention also relates to an infrared band pass filter suitable for use in a parameter detection system according to this invention. The filter comprising a substrate of glass and at least one coating. The filter having a passband in a wavelength region of from 780 nm to 1,000 nm, preferably from 800 to 900 nm, wherein the substrate is made of glass and has an average thickness of from 0.01 to 2 mm, wherein the coating has a thickness of not more than 0.5 mm, and wherein the substrate has a temperature dependence of refractive index at a wavelength of 850 nm in a temperature range from −40° C. to 60° C. of not more than $10 \times 10^{-6}$/K. Generally, the temperature dependence of refractive index of the coating of the filter should be limited as well. It is preferred that the respective value of the coating of the filter is limited to values of less than 0.001/K, preferably less than $12 \times 10^{-6}$/K, preferably less than $10 \times 10^{-6}$/K.

It has been found that it is beneficial when the temperature dependence of refractive index of the substrate is similar to the temperature dependence of refractive index of the coating. Generally, the temperature dependence of refractive index of the coating will be higher than that of the substrate. In some embodiments, the ratio of temperature dependence of refractive index of the coating to the temperature dependence of refractive index of the substrate should not exceed 1,000, more preferably it should not exceed 800, more preferably it should not exceed 500, most preferably it should not exceed 100. The temperature tolerance of the device will be increased if these values are observed.

The coating may comprise a plurality of layers. In some embodiments the coating comprises from 10 to 1,000 layers, preferably from 20 to 200 layers, more preferably from 30 to 80 layers.

The coating may be applied using a number of different methods, including physical vapor deposition (PVD), chemical vapor deposition (CVD), liquid phase deposition, ion beam sputtering deposition, magnetron sputtering, plasma sputtering deposition, thermal evaporation deposition, ion-assisted deposition, electron beam gun evaporation, laser deposition, molecular beam epitaxial, radio frequency heating (RF-heating) or sol-gel. Preferably, thermal evaporation, ion beam sputtering, or plasma sputtering are used as coating method. The coating serves the purpose of reflecting portions of incident light that are not intended to pass the filter. By using coatings to apply the desired pass band properties to the filter, there are less restrictions with regard to the optical properties of the glass as long as the glass has sufficient transmission properties in the passband region.

Suitable coating materials are selected from inorganic and organic coatings. Inorganic coatings are preferred because inorganic coatings usually have better long term stability. Preferred inorganic coating materials are selected from oxides and fluorides. Preferred coating materials are selected from $Nb_2O_5$, $TiO_2$, $Ta_2O_5$, $SiO_2$, $MgF_2$, $Al_2O_3$, $HfO_2$ and $ZnO_2$. All those coating materials have a temperature dependence of refractive index of less than 0.001/K. Preferred coating material that has a temperature dependence of refractive index of less than $10 \times 10^{-6}$/K are selected from $SiO_2$, $MgF_2$, $Al_2O_3$ and $HfO_2$.

This invention further relates to a glass substrate suitable for use in an infrared band pass filter according to this invention, wherein the glass substrate has a transmission more than 90% at a thickness of 10 mm in the wavelength region of from 780 to 1000 nm, preferably from 800 to 900 nm, and wherein the glass substrate has a temperature dependence of refractive index at a wave-length of 850 nm in a temperature range from −40° C. to 60° C. of not more than $10 \times 10^{-6}$/K.

The glass substrate of this invention has a transmission of more than 90%, preferably more than 95% in the wavelength region of from 780 to 1000 nm, preferably in the region of from 800 to 900 nm, at a thickness of 10 mm. Good transmission of the filter substrate is important because any losses of transmission must be compensated for by using higher initial light intensities, which will affect the S/N ratio and lead to higher power consumption of the systems used and might even lead to harmful light intensities in certain applications.

The glass that is used as the substrate in this invention preferably has a Knoop hardness HK0.1/20 of more than 450. Sufficient hardness of the substrate is important because it will increase the overall product lifetime and avoid the formation of scratches on the surface of the filter. Scratches lead to undesired reflections and thus to a decrease in detection efficacy. Usually, very high hardness is not desired in filter substrates because high hardness makes polishing expensive. However, since the glasses of this invention can be produced with excellent surface properties without polishing, the high hardness value does not have a drawback for these glasses.

In the Knoop hardness test the indentation depth of a rhombus-shaped diamond pressed with a defined force and time on the material is measured. The diamond surfaces have defined intersection angles of 172.5° and 130.0°. During pressing of the diamond into the glass plate an elastic and plastic deformation occurs. The size of the permanent indentation depends on the hardness of the material, which is given by the chemical composition. The Knoop hardness can be calculated from the diagonal size d of the indentation using the following formula:

$$HK = 1.4233 \times F/d^2$$

The standard ISO 9385:1990 describes the measurement procedure for glasses. In accordance with this standard, the values for Knoop hardness HK are listed in the data sheets for a test force of 0.9807 N (corresponds to 0.1 kp) and an effective test period of 20 s. The test was performed on polished glass surfaces at room temperature. The data for hardness values are rounded to 10 HK 0.1/20. The microhardness is a function of the magnitude of the test force and decreases with increasing test force.

The glass of the substrate used in this invention preferably has an average thickness of from 0.01 to 1.2 mm, preferably from 0.1 to 0.7 mm, most preferably up to 0.5 mm. The glass used in this invention can be produced in very thin shape. Particularly, the glass can be produced very economically using drawing methods, such as redraw, down draw or overflow fusion; alternatively float processes can be used.

The invention also includes a method of detecting at least one parameter, including the steps of:
a. illuminating a subject or an object of interest using light within a wavelength range of from 780 to 1,000 nm, preferably from 800 to 900 nm;
b. measuring at least one property of the light reflected from the subject or object of interest in a wavelength range of from 780 to 1,000 nm, preferably from 800 to 900 nm; wherein before the at least one property of the light is measured, the light passes through at least one infrared band pass filter, the band pass filter comprising a substrate of glass and at least one coating, the filter having a passband in a wavelength region of from 780 nm to 1,000 nm, preferably from 800 to 900 nm, wherein the substrate is made of glass and has a thickness of from 0.01 to 2 mm, wherein the coating has a thickness of not more than 0.5 mm, and wherein the substrate has a temperature dependence of refractive index at a wave-length of 850 nm in a temperature range from −40° C. to 60° C. of not more than $10 \times 10^{-6}$/K.

It has been found that when a glass is used as the substrate of the filter in the systems of this invention, a high leaching tendency will lead to decreased product lifetime and inconsistent measuring results. Therefore, it is desirable that the leaching properties of the glass used as the substrate are decreased. Preferably, the glass has an HGB1 according to ISO719.

So that uniform results can be obtained the substrate glass should have a very smooth surface. In some embodiments, the RMS roughness of the glass substrate is less than 5 nm, preferably less than 1 nm RMS.

The coefficient of thermal expansion (CTE) of the glass should not deviate too much from the respective CTEs of the coating layers. It has been proven advantageous to use a glass having a CTE of at least $2 \times 10^{-6}$/K and not more than $11 \times 10^{-6}$/K. Preferably, the CTE is at least $5 \times 10^{-6}$/K and less than $8.5 \times 10^{-6}$/K. Glass compositions that are preferably used in this invention will be described in the following.

Glasses used in this invention are characterized by certain compositional ranges. In this description we refer to the cationic compositions of the glasses. In these compositions—if nothing else is indicated—"silicon" refers to $Si^{4+}$, "boron" refers to $B^{3+}$, "aluminum" refers to $Al^{3+}$, "lithium" refers to $Li^+$, "sodium" refers to $Na^+$, "potassium" refers to $K^+$, "magnesium" refers to $Mg^{2+}$, "calcium" refers to $Ca^{2+}$, "barium" refers to $Ba^{2+}$, "zinc" refers to $Zn^{2+}$, "titanium" refers to $Ti^{4+}$, "zirconium" refers to $Zr^{4+}$, "arsenic" refers to the sum of $As^{3+}$ and $As^{5+}$, "antimony" refers to the sum of $Sb^{3+}$ and $Sb^{5+}$, "iron" refers to the sum of $Fe^{3+}$ and $Fe^{4+}$, "cerium" refers to the sum of $Ce^{3+}$ and $Ce^{4+}$, "tin" refers to the sum of $Sn^{2+}$ and $Sn^{4+}$, and "sulfur" relates to the total amount of sulfur in all its valence states and oxidation levels.

The glasses that are suitable for the filter substrate of the present invention have certain preferred composition that will be outlined below. The glasses generally comprise cationic and anionic components. The composition of cations in the glass will be given in cationic percentages (cat.-%), i.e. indicating the molar proportion of the respective cation relative to the total molar amount of cations in the composition. Preferably, the glasses comprise the following components, in cat.-%, based on the total molar amount of cations in the glass: silicon 40 to 75 cat.-%, boron 0 to 23 cat.-%, aluminum 0 to 20 cat.-%, lithium 0 to 18 cat.-%, sodium 0 to 25 cat.-%, potassium 0 to 15 cat.-%, magnesium 0 to 10 cat.-%, calcium 0 to 9 cat.-%, barium 0 to 4 cat.-%, zinc 0 to 7 cat.-%, titanium 0 to 5 cat.-%, zirconium 0 to 3 cat.-%. In some embodiments, the cations in the glasses consist of the cations mentioned in the before-mentioned list to an extent of at least 95%, more preferably at least 97%, most preferably at least 99%. In most embodiments, the cationic components of the glass essentially consists of the mentioned cations.

As anionic components the glass preferably comprises at least one anion selected from fluorine ($F^-$), oxygen ($O^{2-}$), chloride ($Cl^-$). Most preferably, the anions present in the glass consist of oxygen to an extent of at least 95%, more preferably at least 97%, most preferably at least 99%. In most preferred embodiments, the anionic component of the glass essentially consists of oxygen.

A particular glass composition comprises the following components, in cat.-%, based on the total molar amount of cations in the glass: silicon 48 to 60 cat.-%, boron 10.5 to 15.5 cat.-%, aluminum 2 to 8.5 cat.-%, sodium 8 to 14 cat.-%, potassium 5.5 to 13.5 cat.-%, zinc 2 to 6, titanium 1 to 5 cat.-%. In some embodiments, the cations in the glasses consist of the cations mentioned in the before-mentioned list to an extent of at least 95%, more preferably at least 97%, most preferably at least 99%. In most embodiments, the cationic components of the glass essentially consists of the mentioned cations.

Another particular glass composition comprises the following components, in cat.-%, based on the total molar amount of cations in the glass: silicon 45 to 60 cat.-%, aluminum 14 to 20 cat.-%, sodium 15 to 25 cat.-%, potassium 1.5 to 8.5 cat.-%, magnesium 2 to 9, zirconium 0.1 to 1.3 cat.-%, cerium 0.01 to 0.3 cat.-%. In some embodiments, the cations in the glasses consist of the cations mentioned in the before-mentioned list to an extent of at least 95%, more preferably at least 97%, most preferably at least 99%. In most embodiments, the cationic components of the glass essentially consists of the mentioned cations.

The terms "X-free" and "free of component X", respectively, as used herein, refer to a glass, which essentially does not comprise said component X, i.e. such component may be present in the glass at most as an impurity or contamination, however, is not added to the glass composition as an individual component. This means that the component X is not added in essential amounts. Non-essential amounts according to the present invention are amounts of less than 100 ppm, preferably less than 50 ppm and more preferably less than 10 ppm. Thereby "X" may refer to any component, such as lead cations or arsenic cations. Preferably, the glasses described herein do essentially not contain any components that are not mentioned in this description.

The matrix of the glass comprises silicon in proportions of 40 to 75 cat.-%. Silicon is an important network former in the glass matrix which is very important for the glass properties. In particular, silicon cations are important for the chemical resistance, hardness and scratch resistance of the glass. In most embodiments the glasses comprise at least 43 cat.-% of silicon, more preferably at least 45 cat.-% of silicon, still more preferably at least 47.5 cat.-% of silicon, and most preferably at least 48 cat.-% of silicon. However, contents of silicon cations which are too high may result in an increase of the glass transition temperature, making glass production uneconomical. Therefore, it is particularly preferable that the content of silicon cations is at most 75 cat.-%, further preferable at most 70 cat.-%, still more preferable at most 65 cat.-%, and most preferable at most 60 cat.-%.

Besides silicon cations the glass also comprises at least one second network former. The glasses contain boron cations as an additional network former in proportions of 0 to 23 cat.-%. Through its network forming properties boron cations essentially support the stability of the glass. In the case of contents of boron cations which are too low, the required stability in the glass system cannot be guaranteed. In some embodiments the glasses comprise at least 0 cat.-% of boron, more preferably at least 5 cat.-% of boron, still more preferably at least 7.5 cat.-% of boron, and most preferably at least 10.5 cat.-% of boron. Nevertheless, in the case of contents of boron cations in the glass which are too high the viscosity may be reduced strongly so that a reduction of the crystallization stability has to be accepted. Therefore, it is particularly preferable that the content of boron cations is at most 23 cat.-%, further preferable at most 20 cat.-%, still more preferable at most 18 cat.-%, and most preferable at most 15.5 cat.-%.

In the glasses preferably the sum of silicon and boron cations cat.-% is from 40 to 95. In some embodiments the sum of silicon and boron cations cat.-% in the glasses is at least 45 cat.-%, more preferably at least 48 cat.-%, still more preferably at least 50, and most preferably at least 60 cat.-%. It is particularly preferable that the sum of silicon and boron cations cat.-% in the glasses is at most 95 cat.-%, further preferable at most 85 cat.-%, still more preferable at most 75.0 cat.-%, and most preferable at most 72 cat.-%.

It has been found that the temperature dependence of refractive index is influenced by the network formers aluminum, silicon and boron in the glass. Therefore, the glasses show a ratio of the sum of aluminum and boron relative to the amount of silicon in cationic percentages of from 0 to 1. Preferably, this ratio is from >0 to 0.8, more preferably from >0.25 to 0.6, most preferably from 0.3 to 0.4.

In the glasses preferably aluminum cations are contained in proportions of 0 to 20 cat.-%. The addition of aluminum cations results in improved glass forming properties and generally supports the improvement of chemical resistance. In some embodiments the glasses comprise at least 0 cat.-% of aluminum, more preferably at least 1 cat.-% of aluminum, still more preferably at least 2 cat.-% of aluminum, and most preferably at least 3 cat.-% of aluminum. However, contents of aluminum cations which are too high result in an increased tendency to crystallization. Therefore, it is particularly preferable that the content of aluminum cations is at most 20 cat.-%, further preferable at most 15 cat.-%, still more preferable at most 10 cat.-%, and most preferable at most 8 cat.-%.

The glasses preferably contain fluxing agents to improve melting properties, particularly comprising alkali metal cations and/or alkaline earth metal cations. Preferably, the sum of fluxing agents $\Sigma\{\Sigma R^{2+}$ (R=Mg, Ca, Sr, Ba)$+\Sigma R^+$ (R'=Li, Na, K)$\}$ preferably is 5 to 40 cat.-%. In some embodiments the sum of the amounts of the fluxing agents in the glasses is at least 5 cat.-%, more preferably at least 7 cat.-%, still more preferably at least 12 cat.-%, and most preferably at least 15 cat.-%. If the amount of fluxing agents in the glass is too high, chemical resistance will decrease. It is particularly preferable that the sum of the fluxing agents in the glasses is at most 35 cat.-%, further preferable at most 30 cat.-%, still more preferable at most 25 cat.-%, and most preferable at most 23 cat.-%.

Alkali metal cations improve the meltability of the glass and thus allow an economic production. Also, they may are necessary for allowing chemical strengthening of the glass by ion exchange treatment. During the production of the glass the alkali metal cations serve as fluxing agents. The sum of the amounts of the alkali metal cations lithium, sodium and potassium in the glasses preferably is 0 to 35 cat.-%. In some embodiments the sum of the alkali metal cations is at least 5 cat.-%, more preferably at least 7 cat.-%, still more preferably at least 10 cat.-%, and most preferably at least 15 cat.-%. However, if contents of alkali metal cations are too high the weathering resistance of the glass may be compromised and thus the range of applications thereof may strongly be limited. Therefore, it is particularly preferable that the sum of the alkali metal cations is at most 35 cat.-%, further preferable at most 30 cat.-%, still more preferable at most 25 cat.-%, and most preferable at most 23 cat.-%.

In the glasses preferably lithium cations are contained in proportions of 0 to 18 cat.-%. Lithium serves as a fluxing agent and has excellent properties for ion exchange strengthening. However, lithium affects chemical stability of the glasses to a great extent so that its content should be limited. It is particularly preferable that the content of lithium cations is at most 18 cat.-%, further preferable at most 10 cat.-%, still more preferable at most 3 cat.-%, and most preferable at most 1 cat.-%. In some embodiments the glasses are free of lithium cations.

In the glasses preferably sodium cations are contained in proportions of 0 to 25 cat.-%. Sodium is a good component for ion exchange treatment. But, as with all alkali metal ions the amount of this component should not be too high because it decreases chemical stability. In some embodiments the glasses comprise at least 3 cat.-% of sodium, more preferably at least 5 cat.-% of sodium, still more preferably at least 8 cat.-% of sodium, and most preferably at least 9 cat.-% of sodium. It is particularly preferable that the content of sodium cations is at most 23 cat.-%, further preferable at most 22 cat.-%, still more preferable at most 20 cat.-%, and most preferable at most 15 cat.-%.

In the glasses preferably potassium cations are contained in proportions of 0 to 15 cat.-%. The negative impact of potassium on chemical stability is less strong compared to the other alkali metal ions. However, potassium is not suitable for ion exchange treatment. Also, the content of potassium is preferably limited because it contains isotopes that emit beta rays. In some embodiments the glasses comprise at least 1 cat.-% of potassium, more preferably at least 2 cat.-% of potassium, still more preferably at least 3 cat.-% of potassium, and most preferably at least 5.5 cat.-% of potassium. It is particularly preferable that the content of potassium cations is at most 15 cat.-%, further preferable at most 13 cat.-%, still more preferable at most 12 cat.-%.

It has been found that the leaching tendency of the substrate glass can be reduced by using both sodium and potassium in the glass and keeping the ratio of sodium to potassium in cat.-% in a range of up to 5, more preferably up to 4.5, more preferably up to 3.5, preferably up to 2.0 and most preferably at less than 1.6. Keeping this ratio low, i.e. the sodium does not exceed a certain amount relative to the amount of potassium, provides for glasses having good meltability and excellent chemical and hydrolytical resistance. Specifically, such glasses will have an HGB1 according to ISO 719:1989. However, in order to adjust the viscosity in the melt to a desirable value, the ratio of sodium to potassium should be more than 0.5, preferably more than 0.7 and most prefer-ably at least 0.8.

Alkaline earth metal cations improve the meltability of the glass and thus allow for an economic production. During the production of the glass they serve as fluxing agents. The sum of the alkaline earth metal cations magnesium, barium and calcium in the glasses preferably is of 0 to 15 cat.-%. Alkaline earth metal ions affect chemical resistance of the glass with little positive effects in terms of ion exchange treatment. Hence, in this invention the glasses do preferably not comprise any alkali earth metal ions. It is particularly preferable that the sum of the alkali earth metal cations in the glasses is at most 13 cat.-%, further preferable at most 10 cat.-%, still more preferable at most 5 cat.-%, and most preferable at most 1 cat.-%. In some embodiments the glasses are free of alkali earth metals. Moreover, alkaline earth metal cations and zinc cations may be used to adjust the viscosity of the glasses, particularly the fine tuning of the viscosity-temperature profile. Moreover, alkaline earth metal cations and zinc cations—as alkali metal cations—may be used as fluxing agents. The glasses are preferably free of at least one cation selected from the group comprising magnesium cations, calcium cations, strontium cations, barium cations and zinc cations. Preferably, the glasses are free of magnesium cations, calcium cations, strontium cations and barium cations.

In the glasses preferably magnesium cations are contained in proportions of 0 to 10 cat.-%. It is particularly preferable that the content of magnesium cations is at most 8 cat.-%, more preferably at most 6 cat.-%. In some embodiments the glasses are free of magnesium. In the glasses preferably calcium cations is contained in proportions of 0 to 9 cat.-%. It is particularly preferable that the content of calcium cations is at most 8 cat.-%, further preferable at most 3 cat.-%. In some embodiments the glasses are free of calcium. In the glasses preferably barium cations are contained in proportions of 0 to 4 cat.-%. It is particularly preferable that the content of barium cations is at most 4 cat.-%, further preferable at most 3 cat.-%, still more preferable at most 2 cat.-%, and most preferable at most 1 cat.-%. In some embodiments the glasses are free of barium. In some embodiments the glasses are free of strontium.

In the glasses preferably zinc cations are contained in proportions of 0 to 7 cat.-%. Zinc cations may be contained in the glass as an additional fluxing agent as well as for adjusting the melting point in a targeted manner. By the addition of the network modifier zinc the melting point of glass may be reduced. In some embodiments the glasses comprise at least 1 cat.-% of zinc, more preferably at least 2 cat.-% of zinc, still more preferably at least 3 cat.-% of zinc. However, contents of zinc cations which are too high may result in a reduction of the melting point of the glasses. It is particularly preferable that the content of zinc cations is at most 6 cat.-%, further preferable at most 5 cat.-%.

In the glasses preferably titanium cations are contained in proportions of 0 to 5 cat.-%. Titanium cations are added to the glasses for improving their optical properties. In particular, with the addition of titanium, the refractive index of the glasses can be adjusted in a targeted manner. The refractive index increases with an increasing content of titanium cations of the glass. The addition of titanium cations is connected with a further advantage where the UV edge of the transmittance spectrum of the glass is shifted to higher wave lengths, wherein this shift is higher, when more titanium is added. In some embodiments the glasses comprise at least 0.1 cat.-% of titanium, more preferably at least 0.5 cat.-% of titanium, still more preferably at least 1 cat.-% of titanium, and most preferably at least 2 cat.-% of titanium. However, contents of titanium cations which are too high may result in undesirable crystallization of the glass. Titanium cations may increase the refractive index of the glasses. Particularly together with zirconium cations, titanium cations may deteriorate transmission in the blue spectral range and thus may shift the UV-edge into the longer wave lengths. Therefore, it is particularly preferable that the content of titanium is at most 5 cat.-%, further preferable at most 4 cat.-%.

In the glasses preferably zirconium cations are contained in proportions of 0 to 3 cat.-%. Zirconium cations may be used to adjust the refractory index of the glasses. However, a content of zirconium cations, which is too high, may decrease the meltability and particularly may lead to stronger crystallization of the glasses. It is particularly preferable that the content of zirconium is at most 2 cat.-%, further preferable at most 1 cat.-%, still more preferable at most 0.5 cat.-%. In some embodiments the glasses are free of zirconium.

BRIEF DESCRIPTION OF THE DRAWINGS

The above mentioned and other features and advantages of this invention, and the manner of attaining them, will become more apparent and the invention will be better understood by reference to the following description of an embodiment of the invention taken in conjunction with the accompanying drawing, wherein:

FIG. 1 shows a transmission spectrum of a substrate glass of this invention.

The exemplifications set out herein illustrate embodiments of the invention and such exemplifications are not to be construed as limiting the scope of the invention in any manner.

DETAILED DESCRIPTION OF THE INVENTION

Examples

Example glass substrates and example filters were prepared and some properties were measured. The glass compositions tested can be seen in table 1 below.

Composition Examples

The following table 1 shows exemplary glass compositions in cat.-% that are useful as substrate glasses in the compositions of this invention. The glasses shown in table 1 contained only oxides as the anionic component, i.e. the glasses were oxidic.

TABLE 1

| | Glass | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| silicon | 55 | 52 | 65 | 65 | 57 | 50 | 48 | 70 | 60 | 56 | 54 | 49 |
| boron | 16 | | | | 13 | 14 | 1 | 20 | 15 | | | 3 |
| aluminum | 19 | 17 | | 4 | | 6 | 17 | 2 | 6 | 14 | 13 | 13 |
| lithium | | | | | | | 16 | | | | | <1 |
| sodium | | 21 | 19 | 15 | 11 | 10 | 14 | 7 | 16 | 22 | 18 | 24 |
| potassium | | 5 | 6 | 10 | 8 | 11 | <1 | <1 | | 2 | 7 | 5 |
| magnesium | 4 | 5 | | | | | | | | 5 | 8 | 3 |
| calcium | 5 | | 8 | 7 | | | <1 | | 3 | <1 | <1 | 2 |
| barium | 1 | | <1 | 1 | | | | | | | | |
| zinc | | | 2 | 3 | 4 | 5 | | | <1 | | | |
| titanium | | | <1 | <1 | 3 | 3 | | | | | | |
| zirconium | | <1 | | | | | 2 | | | <1 | <1 | <2 |
| arsenic | <1 | | | | | | | | | | | |
| antimony | <1 | | <1 | <1 | <1 | | | | <1 | | | <1 |
| cerium | | <1 | | | | | <1 | | | | | |
| iron | | | | | | | <1 | <1 | | <1 | <1 | |
| sulfur | | | | | | | <0.6 | | | | | |
| tin | | | | | | | | | | <1 | | <1 |
| Na/K | — | >4 | >3 | >1 | >1 | <1 | >14 | >7 | — | >11 | >2 | >4 |
| (Al + B)/Si | 0.6 | 0.3 | 0 | 0 | 0.3 | 0.4 | 0.4 | 0.3 | 0.35 | 0.25 | 0.25 | 0.3 |

The compositions above are the final compositions measured in the glass. The skilled person knows how to obtain these glasses by melting the necessary raw materials.

Producing Glass Substrate

Glasses were produced using suitable raw materials to obtain the final compositions shown in table 1. Raw materials were melted in a melting crucible. After melting the glass was formed into thin glass articles having thicknesses of about 0.3 mm.

All of the glasses disclosed above could be produced using the down draw method. The down draw method is as such known to the skilled person. This method is a very economical way of producing thin glass articles. Not every glass can be produced into thin glass articles with the down draw method. It is one advantage of the glasses used in this invention that the glass compositions can be processed in the down draw process. An alternative method that can be used as well is the overflow fusion method which is also known to the skilled person.

Alternatively, the glasses can also be processed using the redraw method as, for example as described in US 2015/0274573 A1, or US 2014/0357467 A1.

The temperature dependence of refractive index was measured in the glasses of table 1. For conducting this measurement the following steps were taken. First, the refractive index at −40° C. was measured. Second, the refractive index at 60° C. was measured. Then the temperature dependence of refractive index was calculated using the following formula:

$$(n_{850\ nm/60°\ C.} - n_{850\ nm/-40°\ C.})/100\ K = 10 \times 10^{-6}/K\ \text{or less}\ (n = \text{refractive index})$$

After producing the glass and forming a thin substrate, coatings were applied to the substrate in order to produce an IR band pass filter. A total of 40 coating layers were applied. The IR band pass filter had beneficial properties, including very good transmission in the pass band wave-length region, and good temperature tolerance.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass substrate having an average thickness of the glass substrate from 0.01 to 1.2 mm and having a temperature dependence of refractive index at a wave-length of 850 nm in a temperature range from −40° C. to 60° C. of not more than $10 \times 10^{-6}$/K.

2. The glass substrate according to claim 1, wherein the glass substrate has a transmission of more than 90% at a 10 mm thickness in a wavelength region of 780 to 1,000 nm.

3. The glass substrate according to claim 1, wherein the glass substrate has a Knoop hardness HK0.1/20 of more than 450.

4. The glass substrate according to claim 1, wherein an average thickness of the glass substrate is 0.1 to 0.7 mm.

5. The glass substrate according to claim 1, wherein the glass substrate is produced by a drawing process.

6. The glass substrate according to claim 1, wherein the glass substrate is produced by a float process.

7. An infrared band pass filter, comprising:
a glass substrate; and at least one coating applied to the glass substrate, the glass substrate having a thickness of 0.01 to 2 mm, the glass substrate having a temperature dependence of refractive index at a wavelength of 850 nm in a temperature range from −40° C. to 60° C. of not more than $10\times10^{-6}$/K, and the at least one coating having a thickness of not more than 0.5 mm.

8. The infrared band pass filter according to claim 7, wherein the band pass filter has a passband in a wavelength region of from 780 nm to 1,000 nm.

9. The infrared band pass filter according to claim 8, wherein the band pass filter has a passband in a wavelength region of from 800 nm to 900 nm.

10. The infrared band pass filter according to claim 7, wherein a temperature dependence of refractive index of the at least one coating is less than 0.001/K.

11. The infrared band pass filter according to claim 7, wherein a ratio of the temperature dependence of refractive index of the coating to the temperature dependence of refractive index of the glass substrate does not exceed 1,000.

12. The infrared band pass filter according to claim 7, wherein the coating has from 10 to 1,000 layers.

13. The infrared band pass filter according to claim 7, wherein the at least one coating is formed by physical vapor deposition.

14. The infrared band pass filter according to claim 7, wherein the at least one coating is formed by a sol-gel process.

15. The infrared band pass filter according to claim 7, wherein coating materials are selected from $Nb_2O_5$, $TiO_2$, $Ta_2O_5$, $SiO_2$, $MgF_2$, $Al_2O_3$, $HfO_2$ and $ZnO_2$.

16. An infrared band pass filter, comprising:
a glass substrate; and
at least one coating formed on the glass substrate, the glass substrate having a thickness of 0.01 to 2 mm, the at least one coating having a thickness of not more than 0.5 mm, and a temperature dependent center wavelength drift in the filter is less than 15 nm in a temperature range from −40° C. to 60° C.

* * * * *